US008055132B2

(12) United States Patent
Prat Gomà et al.

(10) Patent No.: US 8,055,132 B2

(45) Date of Patent: Nov. 8, 2011

(54) OPTICAL REMOTE NODE DEVICE AND SUPPORT EQUIPMENT FOR CONSTRUCTING AND EXTENDING FIBER-OPTIC ACCESS NETWORKS

(75) Inventors: Josep Prat Gomà, Barcelona (ES); José Antonio Lázaro Villa, Barcelona (ES)

(73) Assignee: Universitat Politecnica De Catalunya, Barcelona (ES)

( * ) Notice: Subject to any disclaimer, the term of this patent is extended or adjusted under 35 U.S.C. 154(b) by 403 days.

(21) Appl. No.: 12/442,320

(22) PCT Filed: Sep. 19, 2007

(86) PCT No.: PCT/ES2007/000530

§ 371 (c)(1), (2), (4) Date: Mar. 20, 2009

(87) PCT Pub. No.: WO2008/034927

PCT Pub. Date: Mar. 27, 2008

(65) Prior Publication Data

US 2009/0317083 A1 Dec. 24, 2009

(30) Foreign Application Priority Data

Sep. 20, 2006 (ES) .................................. 200602415

(51) Int. Cl.
*H04J 14/00* (2006.01)
*H04J 14/02* (2006.01)

(52) U.S. Cl. .............................. 398/66; 398/68; 398/79

(58) Field of Classification Search .................... 398/66, 398/68, 79, 81, 83, 85, 92

See application file for complete search history.

(56) References Cited

U.S. PATENT DOCUMENTS

| | | | |
|---|---|---|---|
| 2005/0158049 | A1 | 7/2005 | Lee et al. |
| 2006/0013565 | A1 | 1/2006 | Baumgartner |
| 2006/0067692 | A1 | 3/2006 | Park et al. |
| 2006/0147211 | A1 | 7/2006 | Kim et al. |
| 2006/0153567 | A1 | 7/2006 | Kim et al. |

FOREIGN PATENT DOCUMENTS

| | | | |
|---|---|---|---|
| EP | 1128585 | A2 | 8/2001 |
| WO | WO03079597 | A1 | 9/2003 |
| WO | WO2005099148 | A1 | 10/2005 |
| WO | WO2006044212 | A2 | 4/2006 |

OTHER PUBLICATIONS

International Search Report, International Application No. PCT/ES2007/000530, Jan. 21, 2008.

*Primary Examiner* — Armando Rodriguez

(74) *Attorney, Agent, or Firm* — Peter B. Scull; Berenbaum Weinshienk PC

(57) ABSTRACT

Optical remote node (NR) device which is situated at a remote point in a fiber-optic metropolitan or access network, carries out the functions of connecting, and transmitting information between, various sections of the network in a passive manner without a power supply using various optical components which extract the necessary optical signals and optical pumping power from the network to which the remote node is connected, and introduces the optical signals from the sections which it connects into said network, and support equipment which is situated at a point in the network with a power supply, uses the network to provide the pumping power required by the remote nodes and has the electronics needed to carry out functions of monitoring the operation of the remote nodes and regulating their activity.

10 Claims, 5 Drawing Sheets

OPTICAL REMOTE NODE DEVICE AND SUPPORT EQUIPMENT FOR CONSTRUCTING AND EXTENDING FIBER-OPTIC ACCESS NETWORKS

TECHNICAL FIELD

The present invention is related to a device which performs the functions of a Node of communications in fiber-optic passive optical networks (PON). Said Node has to be placed in a remote point of the network, without the an electrical supply, without controlled environmental conditions, nor other active elements, according to the requirement that these PON access networks are passive for reducing the expenses of installation (CAPEX) and operation (OPEX) of the network. As any other Node of a communications network, this Remote Node has to perform, as a main function, the connection between several sections of a network, although in the case of the present invention, with the additional requirement of performing this function in a remote point, in such a way that the insertion of a new NR in any point of an already installed fiber-optic access network should cause a practically imperceptible impact on the quality of the transmitted signals through the network. This way, new network sections can be integrated in a previously installed access network, providing means for growing, and providing service to new users in situations which it is not possible, or it is very expensive to install a new access network for the new users.

The present invention performs the functions of a network node, in the above mentioned restricted and demanding conditions, by means of the incorporation of a set of optical elements and the attendance of an Equipment of Support (ES). The ES would be located in a point of the network having a suitable electrical supply and environmental conditions. It provides to one or several NRs the required optical powers that those NR need for their suitable operation. At the same time, the ES includes the electronics necessary for regulating the suitable operation of the NR by means of direct monitoring of the optical signals of the network or by means of information of the quality of the transmitted signals, provided by other elements of the network.

Preferably the ES is placed in the Central Office (CR), although it could also occupy other positions. One or several ES would provide attendance and supervision to one or several groups of NR distributed along the access network.

STATE OF THE ART

The patent U.S. 2006/0147211 A1 shows an optical access network with a typical tree topology in which a CR (Central Office in the cited patent) sends and receives the signals through a fiber section and, at the end of the fiber, a passive optical component performs the NR functions and distributes the signals between the diverse branches reaching the Optical Network Terminals (ONT). In the specific case of the cited patent, the NR is implemented by a single wavelength multiplexer and demultiplexer. Some other patents include more complex designs of NR: U.S. 2006/013565 A1, U.S. 2006/0153567, WO 2006/044212. The last cited patent (WO 2006/044212) shows a different structure of the access network, having a main ring and other sections with tree structure connected to the ring, by RN implemented by optical-electro-optical components.

The present invention of NR does not use optical-electro-optical components which require electrical supply and, although its preferred implementation performs the function of connecting network sections with tree structure to a ring network, as in WO 2006/044212, a similar version of the proposed NR to this patent is also suitable to other networks having a tree structure or a line of distribution structure as in U.S. 2006/0067692. Being therefore an element of the independent network of the structure of the same and allowing the progressive extension of the same.

DESCRIPTION OF THE INVENTION

The present invention is referred to the design of a Remote Node, and an Equipment of Support, which allows connecting new sections of a fiber-optic access network to an already existing access network (as a particular case, all the access network can also be built by means of the proposed NRs) without any electrical supply neither special working conditions for the NRs, and the insertion of new NRs in the existing network supposes a minimum disturbance for the operation and the quality of the optical signals of the existing network.

The device which is an object of the present patent comprises, in its basic version, four elements or differentiated sections as shown in FIG. 1:

a) a section which performs the functions of extraction of the optical signals of the original network and the insertion in the same, of the originating signals of the new built-in sections (this function is usually called Add&Drop function). The specific design of this section depends on the characteristics of the network sections to be connected (single or double fiber, tree or ring topology) and of the previously installed network. In addition, this section provides a resilience capacity against fiber failure, providing a recovery of the transmission service. Due to that, the structure of this section its structure is more complex than a simple Add&Drop module, as it is described in the "detailed description of the invention" and can be seen in FIG. 5.

b) a section which performs functions of wavelength selection of the signals of the previously installed network to which the new built-in sections can have access, limiting the range of wavelengths at which the new connected users can transmit their information through the previously installed network c) one or several sections of optical fibers doped with Rare Earth elements (as e.g. Erbium, Ytterbium, Praseodymium) which, by means of the necessary optical pumping powers, produce an amplification of the optical signals. The function of this optical gain is, on one hand, to adapt the power level of the signals extracted from the already installed network to the power budget requirements of the built-in networks and, vice versa, to adapt the level of the signals that coming from the new built-in networks to the transmission requirements of the already installed network. On the other hand, the function of this optical gain is to diminish the negative effect of the incorporation of the new NRs to the original network and of the fiber length that could be necessary. This main negative effect of the incorporation of the new NRs is the reduction of the powers of the signals which are propagated by the original network due to the losses of the new introduced components of the new NRs. The doped fiber sections can compensate these extra losses and diminish the impact by providing optical amplification compensation those signal losses.

d) one or several sections composed by compensating optical fibers of the dispersion (or another optical component) that reduces the second main effect of incorporating new NRs and the extension of existing networks. This other degradation of the optical signals is due to the chromatic dispersion of the optical elements introduced by the RN and the new optical fiber lengths introduced by the extension of the network.

On the other hand, the Equipment of Support, according to FIG. 2, provides the pumping powers required by the doped fibers of the NR for adapting the powers of the optical signals as shown in FIG. 2. The ES includes:

a) as main elements, one or several pumping lasers providing the necessary pump powers.

b) one or several elements for monitoring the intensity and quality of the signals propagating through the access network.

c) a set of optical elements: optical couplers that extract a small amount of signal for monitoring functions and; wavelength multiplexers/demultiplexers for inserting the optical pump powers into the fibers of the access network and distributed to the different RNs. This solution for sending the pump powers by means of the optical fibers that transmit the signal include several advantages: on one hand, it reduces the number of necessary fibers in the network; on the other hand, thanks to the Raman effect, a beneficial extra amplification of the optical signals transmitted by optical fibers of the access network takes place allowing the transmission of optical signals to longer distances through the network.

d) a control electronics that, by means of the information received by the monitoring elements or other elements of the access network, regulates the operation of the pumping lasers, realizing therefore a remote control of the operation of the RN and an optimization of its operation.

FIG. 3 shows an example of how the present invention of NR can be applied for the integration of a metropolitan network with an access network, the first one implemented by a ring of double fiber in which the downstream signals propagate from the Central Office (CR) to the Optical Network Unit (ONUs) and the upstream signals transmitted from the ONU to the CR together with the pump powers introduced by the Equipment of Support (ES), located at the CR in this example.

FIG. 4 shows another example of how the present invention of NR can be applied to an access network having a bus/tree topology, and where the downstream signals propagate from the Central Office (CR) to the ONUd and the upstream signals from the ONU to the CR propagates along with the pump powers introduced by the ES. In this example, one of the ES is located close to the CR, another one together with the last NR (e.g in case that this NR corresponds to a node of a metropolitan network with electrical supply) third and forth ES replace, or they are next to, one of the ONU of the built-in network and have an extra fiber section that directly transmits the pumping power to the NR and the rest of the network.

BRIEF DESCRIPTION OF THE DRAWINGS

The FIG. 1 shows a general scheme of the diverse sections of the NR, whose description has been done in the "Brief description of the Invention". The NR connects to the fiber cables (1*a*) and (1*b*), which contain one or more optical fibers shown by a bidirectional arrow, which indicates the double direction of the propagation of the optical powers. A compensating element of the dispersion (2), implemented by, for example, a Dispersion Compensating optical Fiber (DCF), reduces the chromatic dispersion generated by the fiber sections between the NRs, and by the optical components which are included in the NRs. Diverse sections of fibers or doped optical fibers with Rare Earth elements (3) use the pump powers sent by the ES through the fiber network for providing optical gain to the optical signals. A set of wavelength multiplexers and demultiplexers (4) extract and introduce the pump powers at the optical fibers of the network. The optical fibers which only transmit pumping are represented by discontinued lines in the figure. A set of directional couplers (also called power splitters) (5) extract and introduce a portion of the optical signals from the fibers of the network. The optical filters (6) select the wavelengths of the optical signals limiting the wavelengths of the signals that the new connected sections can enter in the network or drop from the network. The NR connects the new sections to the network by means of optical fibers (7).

DETAILED DESCRIPTION OF THE INVENTION

Figure 5:
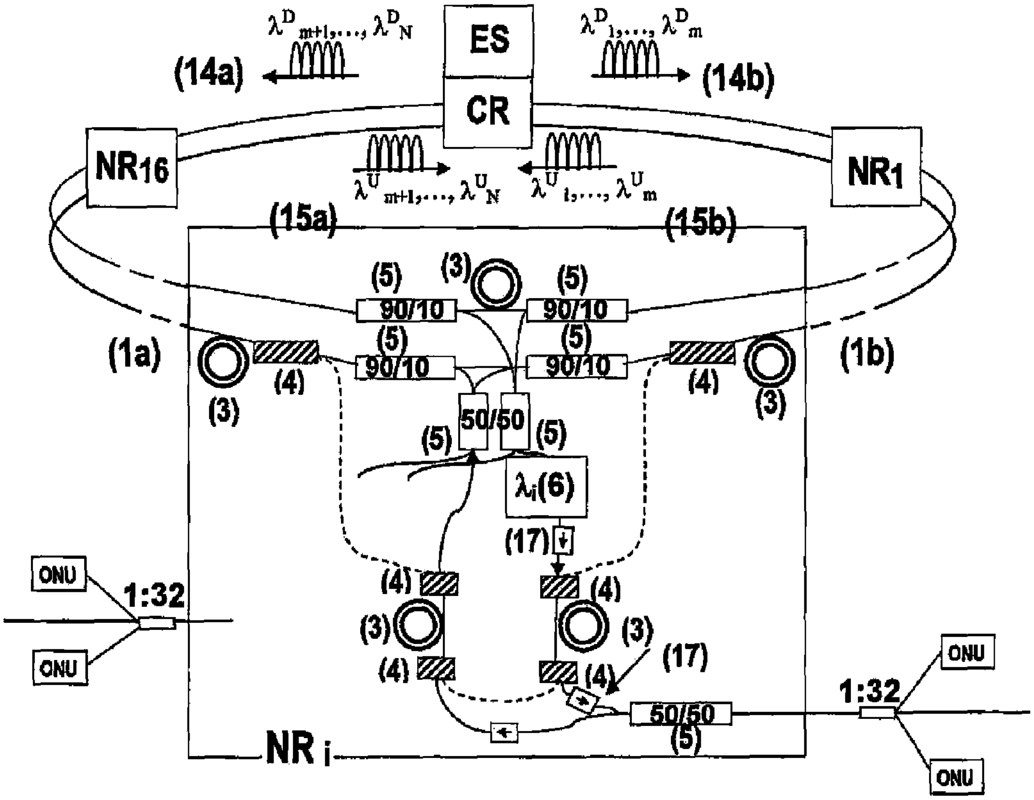
FIG. 5 shows a preferred implementation showing in detail the components and the connections of the NR for adapting the transition from double fiber ring to single fiber trees and implementing the redundancy capacity for assuring the resistance against any fiber failure of the main ring. In case of fiber failure, the directional couplers (5) are of two different types. The (90/10) couplers, that is to say that 90% of the optical power that arrives at the coupler (NR) is transmitted to the main ring fiber and 10% of the power are derived (dropped) to the secondary fiber, meanwhile the (50/50) couplers, distribute the optical powers at the same rate (50%) between the 2 output fibers of the coupler. The rest of the components have been already described in the previous figures except (17) that represents optical isolators, allowing the propagation of the signals in one direction, but blocking the propagation of signals propagating in the opposite direction.
Figure 6:
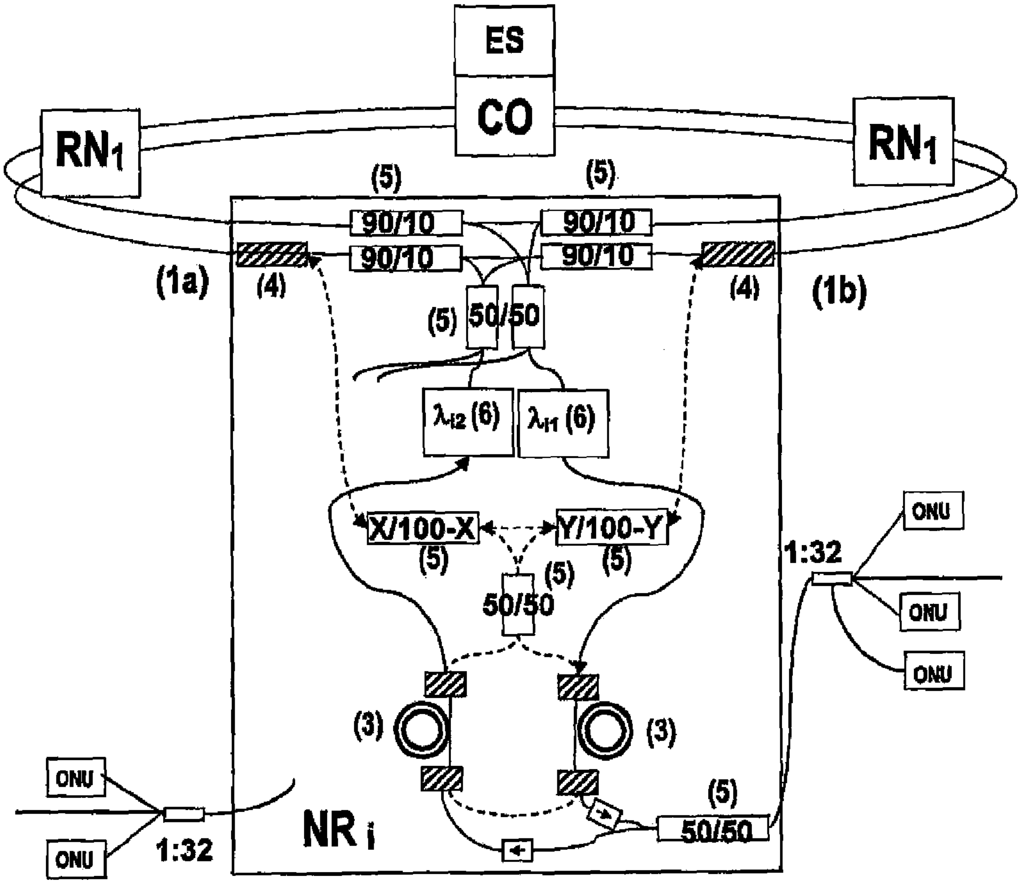
FIG. 6 shows an advanced design of the NR, in which the whole pumping powers does not propagate thorough doped fibers, but only a fraction (100−X)% and (100−Y)% of the pumping powers arriving from the left part (1*a*) and right of the network (1*b*), respectively, are sent to the doping fibers. Consequently, the X % and Y % of the arriving pumping powers are transmitted to the network without being used by the Remote Node. An optical power splitter 50/50 (50%) assures the resistance of the design against fiber failures of the network at which the Remote Node is connected.
Figure 7:
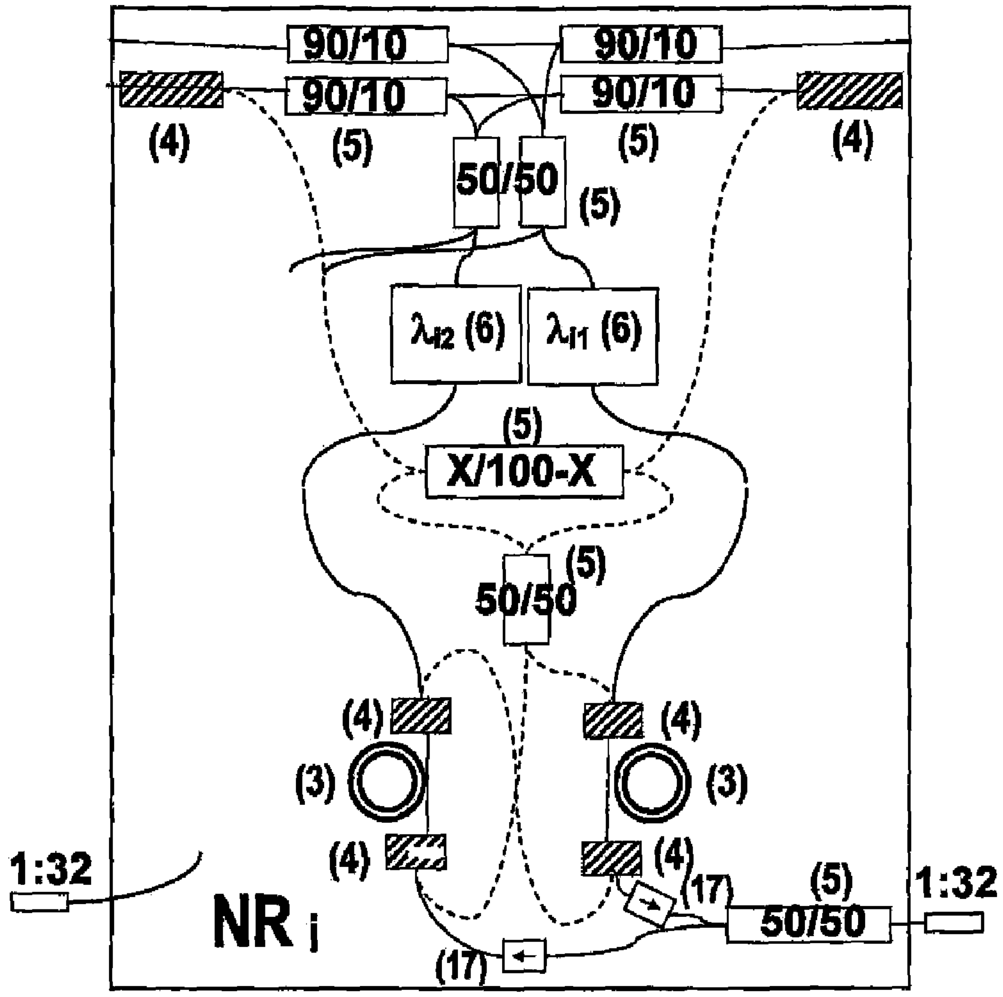
FIG. 7 shows an optimized design of NR, in which the pair of optical directional couplers (5); X/100−X and Y/100−Y are replaced by a unique coupler, reducing the pump power consumption and increasing the efficiency.

FIG. 5 shows a detailed design of the present invention, a preferred implementation, less general than the one described in the previous section of the invention. The design is the one required for its use in a access network formed by a main double fiber ring and secondary sections with tree structure.

For this specific implementation of the invention, the device comprises:

a) a set of optical directional couplers (also known as power splitters) (90/10) extracting and inserting signals to the main ring which, in this example, drop a 10% of the optical signals propagating through the ring at any wavelength in the typical range of optical communication.

b) another set of symmetrical couplers or power splitters which divide the optical powers in two equal sections (50/50), are assuring that in case that the main ring fiber is cut or in case of any other fiber failure, the signals still arrive from the CR to the ONUs and vice versa.

c) optical filters which select and restrict the wavelengths at which the ONUs of each network section have access and at which they can transmit information through the access network.

d) doped fibers (or equivalent, as e.g. doped optical waveguides) which amplify and adapt the powers of the signals dropped and added to the network.

e) wavelength de/multiplexers extracting the pump power of the main network and distributing the pump powers to the doped fibers for the amplification of the signals.

f) optical isolators and optical couplers 50%/50% e.g. allowing the connection between the double fiber and single fiber sections of the network, dismissing the propagation of fluorescence, reflected signals and Rayleigh diffusion that otherwise would decreases the quality of the signals.

Figure 1:
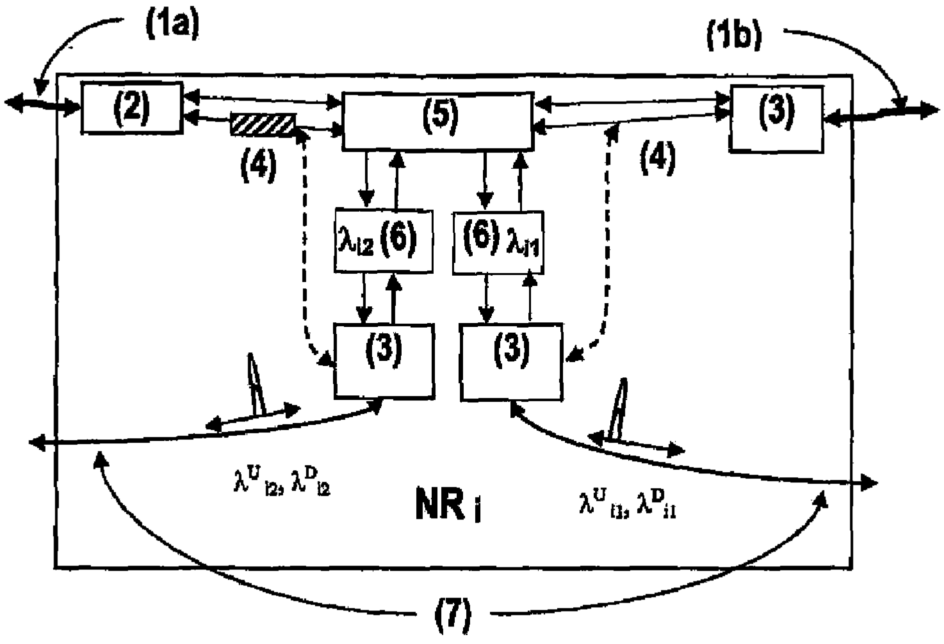
Figure 2:
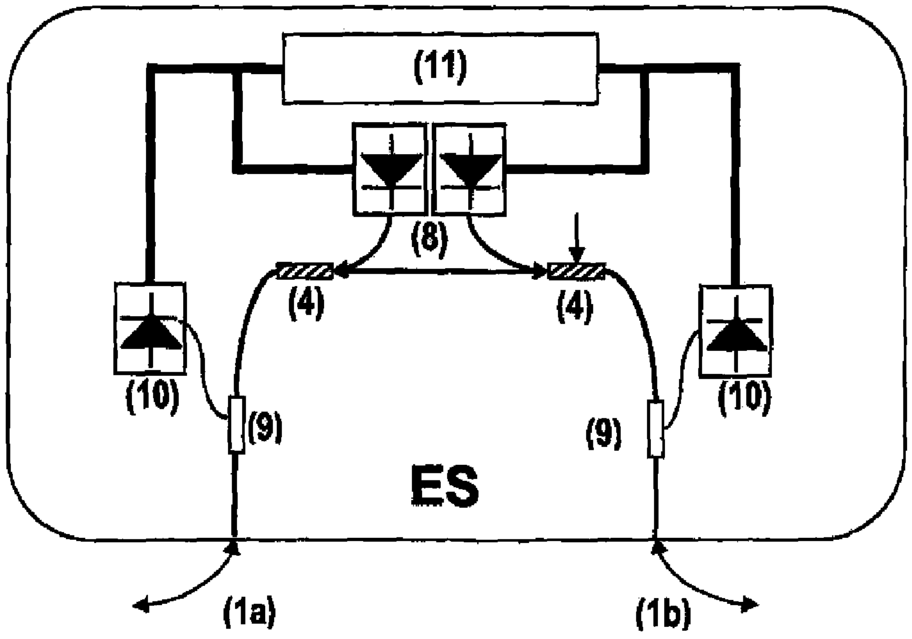
FIG. 2 shows the scheme of the ES, also described in the previous section. Several pumping lasers (8) generate the optical powers required by the NRs for performing their functions. The wavelength multiplexers and demultiplexers (4) (WDM) introduce the pump powers to the optical fibers transmitting the optical signals. On the other hand, the optical directional couplers (or power splitters) (9) of the ES extract a small portion of the optical signal and pump powers propagating through the optical fibers, so that the optical detectors (10) can generate a series of electrical signals monitoring the characteristics of the optical signals that they are receiving from the network. The ES has a connection to the network to transmitting the optical powers for obtaining the optical signals detected by (10) by means of connections (connectors or splices) to the optical fibers of the network (1*a*) and (1*b*). Finally, the control electronics (11) realizes an analysis of the electrical signals generated by the optical detectors and it regulates the intensity of the emission the pumping lasers, regulating that remote form the activity of the NRs.
Figure 3:
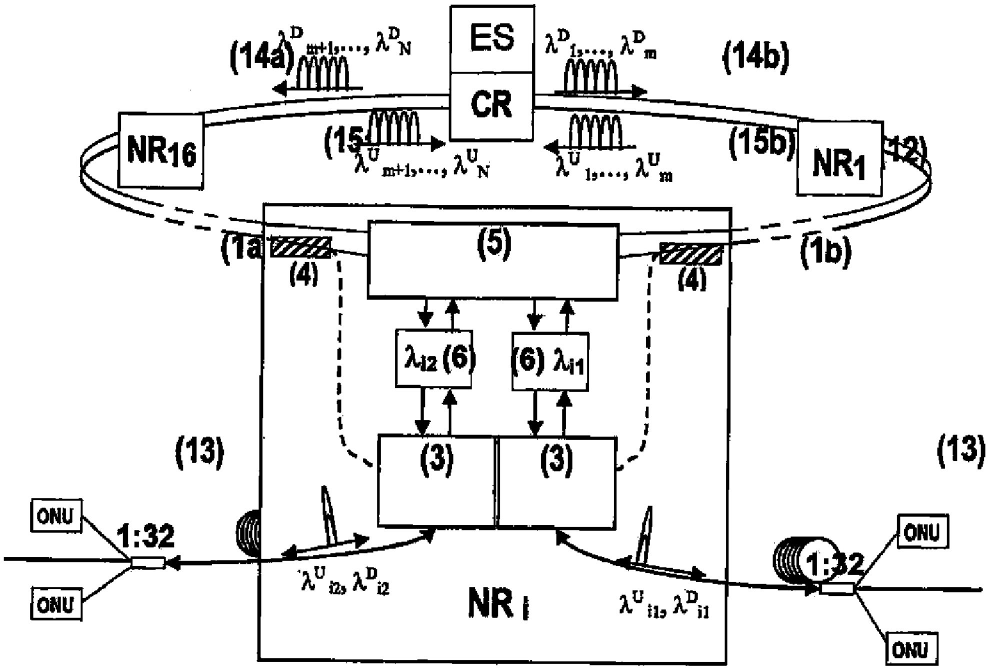
FIG. 3 shows the principle of operation of the RN of FIG. 1 in a specific network formed by a double fiber ring (12) and single fiber secondary sections with tree structure (13). The ES is placed in this example along with the CR providing to the NRs the pumping powers through the network (12). As an example, a set of optical signals (14*a*) propagates from the CR for the NRs by the left fiber and another set (14*b*) propagates from the CR for the NRs by the right fiber. Also, a third set of signals coming from the NRs (15*a*) arrives at the CR by the left fiber (1*a*) and a fourth set of signals (1*b*) does by the right fiber (1*b*). At each NR, the WDM (4) extracts (de-multiplexes) the pump power from the fibers of the network and sends it to the doped fibers (3) where it is partially consumed. On the other hand, the optical directional couplers (or power splitters) (5) extract a portion of the optical signals propagating through the network and send them towards the optical filters (6), that select the wavelengths that can propagate through the network sections connected to the NR number i. These signals are properly amplified by the doped fibers (3) and sent to the final users (ONU), connected to the distribution sections of the network by a relatively long optical fiber of (13). Regarding the up-stream, the optical signals generated by the ONUs at the tree sections (13) are sent to the corresponding NR, amplified (3), wavelength selected (filtered) (6) and inserted in the network (5).
Figure 4:
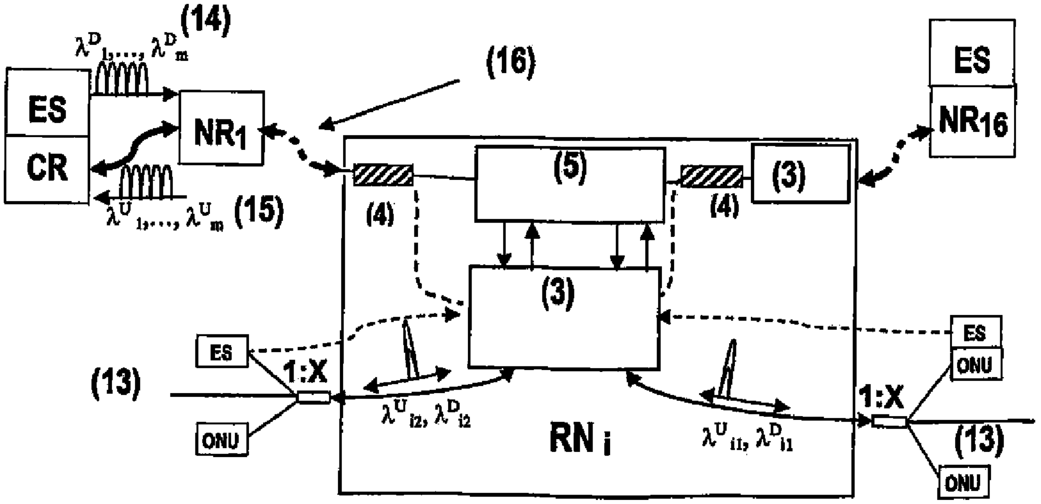
FIG. 4 shows the principle of operation of the NR of FIG. 1 in a specific access network (16) with bus topology and secondary single fiber sections (13) with tree structure. In this case, also alternative positions of ES are shown as: connected to the optical fiber section (13), together with one of the ONUs, with some of the NR, that maybe exceptionally, receive electrical supply.

According to the principles of the invention, the downstream signals generated at the CR arrive at one of the NR (indifferently by the right or the left of ring) and a small part from all of them (10% in the example) is dropped by the 90/10 couplers to the 50/50 couplers. The 50/50 couplers distribute the signal to two tree network sections. In FIG. 4, only the components for one of these trees are shown for simplicity, since both are similar.

If it is necessary, an optical filter selects the wavelengths (the simplest case, a single wavelength) at which each tree section has access and which varies from one NR to another one. The downstream signal, once dropped filtered and having a low level of intensity, is amplified, by optical fiber sections doped with Erbium, and inserted in the tree sections by means of a pair of insulators and couplers 50/50. The signal reaches the ONUs and the ONUs can generate their own signal or reuse the arriving signals from the CR. In this second case, a bidirectional propagation of signals at the same wavelength throughout a single fiber takes place.

The upstream signals, originated at the ONUs reach the NR through the coupler 50/50 along with two isolators. The upstream signal is routed to a different doped fiber adapting the intensity of the upstream signal, attenuated by the tree distribution, to the requirements of the main ring. The amplified upstream signals enter a coupler 50/50 which distributes between the two directions of propagation of the ring, in such a way that, even in case of fiber failure, at least one of the two copies of the upstream signals reaches the CR.

Although it is not shown in the figure, small optical fiber sections of dispersion compensating fibers (DCF) are included in the main ring for compensating the chromatic dispersion produced by the couplers and fiber the sections of the main ring.

The invention claimed is:

1. An optical remote node device and support equipment system for one or both of the construction and extension of fiber optic access networks, the system comprising:

I) an optical remote node device having:

a) one or more optical directional couplers performing the functions of:

(i) extracting a fraction of optical signals propagating through one or more of a metropolitan or access network;

(ii) routing the optical signals toward new sections of the network; and (ii) inserting into the metropolitan or access network the optical signals generated in the new sections of the network;

whereby the number of optical directional couplers and the connections among them depend on the characteristics of the already existing metropolitan or access network, and on the characteristics of the new sections of the network, and on the required properties of resilience and recovery of the new and already existing metropolitan or access networks, relative to whether the fiber optic fibers are respectively cut from one or several fibers, and on failures of the network and traffic load balancing;

b) one or more optical filters that:

(i) select, based on the wavelength of the optical signals, the information transmitted through the already existing network to which each one of the new sections of the network that are connected to the optical remote node device have access; and (ii) limit the range of wavelengths of the optical signals that can be transmitted to and through the new sections of the access network; and, c) one or more fiber sections doped with one or several rare earth elements such that, by optical pumping power at the adequate wavelength, produces an optical amplification:

(i) of the extracted optical signals of the main network, for adapting the power level of these signals to the levels required by the new access sections;

(ii) of the signals arriving at the optical remote node device, for adapting them to the power levels required by the already existing access network; and (iii) for compensating for the power losses caused by the components of the optical remote node device of the optical signals propagating through the already existing network, so that the impact of introducing a new optical remote node device in the already existing network is minimal; and, II) a secondary device comprising:

a) one or several pumping lasers which provide the optical pumping powers required by one or several optical remote node devices;

b) one or several wavelength de/multiplexers allowing the secondary device to introduce pumping powers in the access network so that optical signals arrive at the optical remote node devices without causing interference to the optical signals that they propagate through the network;

c) the electronics of control which regulate the intensity of the lasers based on the quality of the optical signals of the network that this system monitors.

2. An optical remote node device and support equipment system according to claim 1, the optical remote node device further including one or several wavelength de/multiplexers allowing for extracting the pumping powers, or a fraction thereof, propagating through the network access to be used by the doped fibers and reintroducing in the network the leftover pumping powers.

3. An optical remote node device and support equipment system according to claim 1, wherein the doped fiber sections can be replaced by doped waveguides providing a similar performance.

4. An optical remote node device and support equipment system according to claim 1, the optical remote node device further incorporating elements for compensating the dispersion produced by long fiber sections connecting the optical remote node device with the already existing network or with the new sections of the network.

5. An optical remote node device and support equipment system according to claim 1, the optical remote node device being further adapted for performing the functions of connection of a new section of a fiber-optic access network to an existing network.

6. An optical remote node device and support equipment system according to claim 1, the optical remote node device further having an absence of an optical filter for wavelength selection.

7. An optical remote node device and support equipment system according to claim 1, the optical remote node device further including directional couplers, adapted to provide that not all the pumping power propagating through the network crosses doped fibers of the optical remote node device, but only a fraction of these powers.

8. An optical remote node device and support equipment system according to claim 1, the optical remote node device further including a smaller number of couplers.

9. An optical remote node device and support equipment system according to claim 1, the optical remote node device further includes one or more optical add-drop multiplexers substituted for one or several of the optical directional couplers or one or several of the optical filters selecting the wavelengths of the signals at which the main access network and the new section can communicate.

10. An optical remote node device and support equipment system according to claim 1, wherein the pumping powers are sent by the same optical fibers by which the optical signals are transmitted, so that the optical signals undergo an effective smaller attenuation when propagating by the optical fibers of the network, due to the Raman effect.

* * * * *